United States Patent [19]
Chou et al.

[11] Patent Number: 5,805,772
[45] Date of Patent: Sep. 8, 1998

[54] SYSTEMS, METHODS AND ARTICLES OF MANUFACTURE FOR PERFORMING HIGH RESOLUTION N-BEST STRING HYPOTHESIZATION

[75] Inventors: Wu Chou, Berkeley Heights; Biing-Hwang Juang, Warren; Chin-Hui Lee, New Providence, all of N.J.; Tatsuo Matsuoka, Tokyo, Japan

[73] Assignee: Lucent Technologies Inc., Murray Hill, N.J.

[21] Appl. No.: 366,843

[22] Filed: Dec. 30, 1994

[51] Int. Cl.$^6$ ...................................................... G10L 9/00
[52] U.S. Cl. ....................... 395/2.64; 395/2.63; 395/2.65; 395/2.66
[58] Field of Search ................................... 395/2.64, 2.65, 395/2.66, 2.61, 2.63, 2.51, 2.62, 2.6, 2.45, 2.75, 2.79

[56] References Cited

U.S. PATENT DOCUMENTS

| | | | |
|---|---|---|---|
| 4,819,271 | 4/1989 | Bahl et al. | 381/439 |
| 5,241,619 | 8/1993 | Schwartz et al. | 395/2 |
| 5,268,990 | 12/1993 | Cohen et al. | 395/2 |
| 5,349,645 | 9/1994 | Zhao | 395/2.52 |
| 5,502,790 | 3/1996 | Yi | 395/2.65 |

FOREIGN PATENT DOCUMENTS

0243009 A1  10/1987  European Pat. Off. .......... G10L 5/06

OTHER PUBLICATIONS

Chou, W., et al., "An Algorithm of High Resolution and Efficient Multiple String Hypothesization for Continuous Speech Recognition Using Inter–Word Models," Proc., ICASSP 94, pp II–153–II–156. Dec. 1984.

Alleva, Fil, et al., "An Improved Search Algorithm Using Incremental Knowledge for Continuous Speech Recognition," Proc. ICASSP 93, pp II–307–II–310. Dec. 1993.

Soong, Frank K., and Huang, Eng–Fong, "A Tree-Trellis Based Fast Search for Finding the N Best Sentence Hypothesis in Continuous Speech Recognition," Proc. ICASSP 91, pp. 705–708. Dec. 1991.

Schwartz, Richard, and Chow, Yen–Lu, "The N–Best Algorithm: An Efficient and Exact Procedure for Finding the N Most Likely Sentence Hypothesis," Proc. ICASSP 91, pp. 81–84. Dec. 1991.

Primary Examiner—Krista Zele
Assistant Examiner—Scott L. Weaver

[57] ABSTRACT

Disclosed are systems, methods and articles of manufacture for performing high resolution N-best string hypothesization during speech recognition. A received input signal, representing a speech utterance, is processed utilizing a plurality of recognition models to generate one or more string hypotheses of the received input signal. The plurality of recognition models preferably include one or more inter-word context dependent models and one or more language models. A forward partial path map is produced according to the allophonic specifications of at least one of the inter-word context dependent models and the language models. The forward partial path map is traversed in the backward direction as a function of the allophonic specifications to generate the one or more string hypotheses. One or more of the recognition models may represent one phone words.

35 Claims, 7 Drawing Sheets

SYSTEMS, METHODS AND ARTICLES OF MANUFACTURE FOR PERFORMING HIGH RESOLUTION N-BEST STRING HYPOTHESIZATION

TECHNICAL FIELD OF THE INVENTION

The present invention relates in general to speech recognition and understanding, and more particularly to systems, methods and articles of manufacture for performing high resolution N-best string hypothesization.

BACKGROUND OF THE INVENTION

Speech recognition is the process through which one or more words embedded within a speech utterance are identified. The term "word" as used herein includes, without limitation, any word, phrase, lexical unit and/or string.

Each word, as well as the speech utterance, includes one or more features. The features of each word typically define a reference pattern, or recognition model. Each recognition model often includes both acoustic and language models. An acoustic model is often a phonetic model, typically in the form of a Hidden Markov Model ("HMM"). The techniques for developing and utilizing HMMs are known. A language model is typically a statistical model describing the probability that a particular word will occur in a particular language model.

Speech recognition is performed by comparing the features of the speech utterance with the features of one or more words. This is typically accomplished by comparing the features of the speech utterance with one or more recognition models. The comparison is typically performed by a computer, or other processing system. The processing system generally retrieves one or more recognition models from a recognition database. The speech utterance is recognized by the one or more recognition models with which its features most closely match.

N-best, or multiple, string hypothesization and decoding is a process used in continuous speech recognition. The process finds the "N" best solutions from the speech utterance using one or more recognition models. For example, assume arbitrarily that "N" equals two and that a speech utterance has been received. The two "best" solutions for that utterance may be "The car is blue" and "The card is blue".

Continuous speech recognizers often have difficulty verifying or differentiating between the occurrence of particular words, such as "car" and "card", within a speech utterance. Typical automated inbound telephone applications, for example, route incoming calls to particular employees by recognizing a caller's utterance of an employee's name and associating that utterance with the employee's extension. Callers often pronounce names that are not in the directory, or worse, vocalize utterances that are phonetically similar to a different employee's name. Incorporation of N-best string hypothesization principles into the above example enables the telephone application to re-prompt the caller with up to "N" possible alternatives. For example, assuming "N" equals three, three possible alternatives in conjunction with the above example, might be "Smith", "Smythe" or "Smyth". Three conventional N-best string hypothesization approaches are the level building algorithm, the frame synchronous network algorithm, and the forward search scheme.

Inter-word context dependent modeling is a more complex recognition modeling approach. It uses position dependent acoustic recognition models. These recognition models explicitly model inter-word co-articulation. In other words, each inter-word context dependent recognition model incorporates knowledge concerning the words which precede and succeed it. Inter-word context dependent models therefore incorporate global string level constraints that extend beyond word boundaries.

Acoustic models utilizing inter-word context dependency are more accurate. This is due largely to the inherent detail and complexity of the associated recognition models. The processing of a set of inter-word context dependent models is typically conducted according to an active word trellis. An active word trellis is a detailed graph which records the scores and times of words as nodes within the graph. The various paths connecting different nodes are searched during the speech recognition process.

It is desirable to implement an N-best hypothesization scheme utilizing acoustic modeling. The detail and complexity associated with inter-word context dependent models, however, limits their applicability and usefulness. In particular, since inter-word context dependent models are string level models, dependent upon the features of preceding and succeeding words, their utilization requires large amounts of memory, as well as other processing system resources. These requirements are magnified upon the incorporation of an N-best hypothesization scheme, presenting a dominant obstacle to producing multiple accurate string hypotheses.

SUMMARY OF THE INVENTION

Systems, methods and articles of manufacture are provided for performing high resolution N-best string hypothesization during speech recognition. High resolution N-best string hypothesization in accordance with the principles of the present invention incorporates both inter-word context dependent models and long term language models. In particular, long term language model score sets and detailed inter-word, and position, dependent tri-phone context dependent models are utilized to maintain search admissibility and achieve high recognition performance. These tri-phone models are utilized in both the forward and backward search directions.

A processing system in accordance with the principles of the present invention for performing speech recognition includes receiving, storage and processing means. The receiving means receive an input signal representing a speech utterance. The storage means store a plurality of recognition models wherein ones of the recognition models include one or more inter-word context dependent models and one or more language models. The processing means process the received input signal utilizing ones of the plurality of recognition models to generate one or more string hypotheses of the input signal.

The processing means includes both producing and traversing means. The producing means produce a forward partial path map according to the allophonic specifications of at least one of a particular inter-word context dependent model and a particular language model. The traversing means traverse the forward partial path map in the backward direction as a function of the allophonic specifications to generate the one or more string hypotheses.

A method of operation in accordance with the principles of the present invention concerns the generation of at least one string hypothesis from a received input string. The received input string represents a speech utterance. Ones of a plurality of recognition models are utilized to process the received input signal. The plurality of recognition models include at least one of one or more inter-word context dependent models and one or more language models. A search graph is produced in a first direction according to the allophonic specifications of at least one of a particular inter-word context dependent model and a particular language model. The search graph is then traversed in a second direction as a function of the allophonic specifications to generate the one or more string hypotheses. The second direction is in a substantially opposite direction with respect to the first direction.

One embodiment for using and/or distributing the present invention is as software stored to a storage medium. The software embodiment includes a plurality of processing system instructions for controlling at least one processing unit for performing speech recognition. More particularly, the instructions perform high resolution N-best string hypothesization in accordance with the principles of the present invention. The storage mediums utilized to implement the software embodiment may include, without limitation, magnetic, optical, or semiconductor chip, as well as suitably arranged combinations thereof.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which.

DETAILED DESCRIPTION OF THE INVENTION

Figure 1:
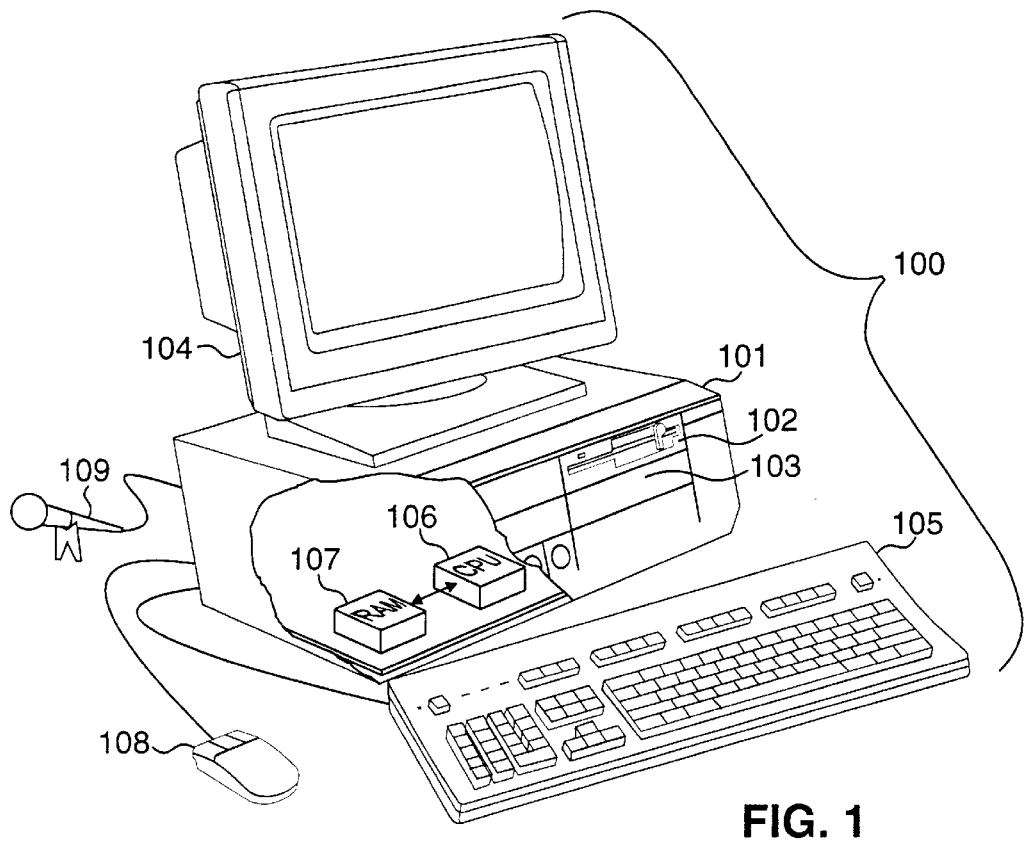
FIG. 1 illustrates an isometric view of an exemplary processing system in accordance with the principles of the present invention.

FIG. 1 illustrates an isometric view of one exemplary processing system, a personal computer 100, which may be programmed to perform continuous speech recognition, and more particularly, to perform high resolution N-best string hypothesization in accordance with the principles of the present invention. The personal computer 100, which is coupled with a conventional microphone 109, comprises a hardware casing 101 (illustrated having a cut-away view), a monitor 104, a keyboard 105 and a mouse 108.

The microphone 109 is operable to receive speech sound waves and to generate electric waves representative of a received speech utterance.

The monitor 104, and the keyboard 105, the mouse 108 and the microphone 109, may be replaced by, and/or combined with, other suitably arranged output and input devices, respectively. The microphone 109, for example, may be replaced by or combined with other suitably arranged sound receiving devices, such as, telephony device and service technologies, including videophone technologies.

Hardware casing 101 includes both a floppy disk drive 102 and a hard disk drive 103. Floppy disk drive 102 is operable to receive, read and write to external disks, while hard disk drive 103 is operable to provide fast access data storage and retrieval. Although only floppy disk drive 102 is illustrated, personal computer 100 may also be equipped with any suitably arranged structure for receiving and/or transmitting data, including, for example, tape and compact disc drives, and serial and parallel data ports. Within the cut away portion of hardware casing 101 is a processing unit 106, coupled with a memory storage device 107, which in the illustrated embodiment is a random access memory ("RAM").

Although personal computer 100 is shown having a single processing unit 106, personal computer 100 may be equipped with a plurality of processing units 106 operable to cooperatively carry out the principles of the present invention. Although personal computer 100 is shown having the single hard disk drive 103 and memory storage device 107, personal computer 100 may similarly be equipped with any suitably arranged memory storage device, or plurality thereof. Although personal computer 100 is utilized to illustrate a single exemplary embodiment of a processing system, the principles of the present invention may be implemented within any processing system having at least one processing unit and an input receiving means for receiving speech input data, including, for example, sophisticated calculators and hand held, mini, main frame and super computers, including RISC and parallel processing architectures, as well as within processing system network combinations of the foregoing.

Figure 2:
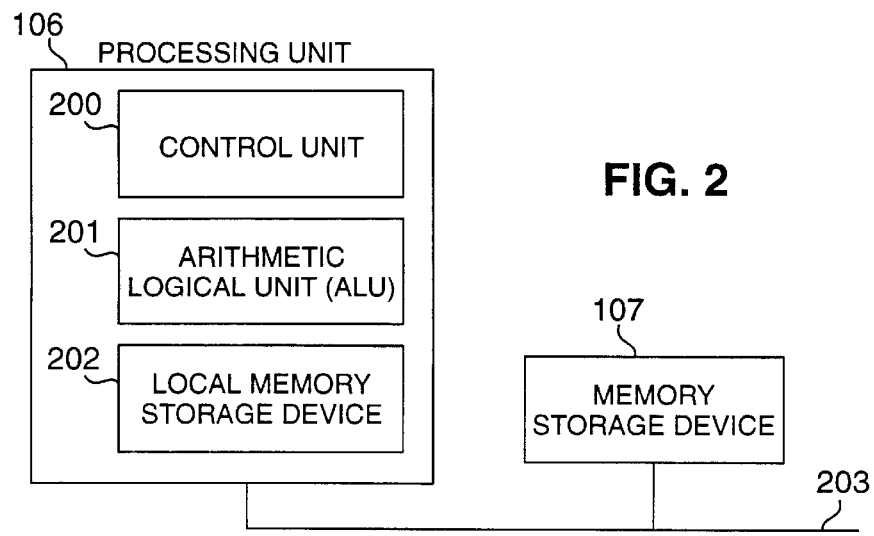
FIG. 2 illustrates a block diagram of an exemplary microprocessing system which may be utilized in conjunction with the processing system in FIG. 1.

FIG. 2 illustrates a block diagram of an exemplary microprocessing system which may be utilized in conjunction with personal computer 100. The microprocessing system includes a single processing unit 106 coupled via a data bus 203 with a memory storage device 107, such as the RAM illustrated in FIG. 1, for example. Memory storage device 107 is operable to store one or more processing system instructions which processing unit 106 is operable to retrieve, interpret and execute. Processing unit 106 includes a control unit 200, an arithmetic logic unit ("ALU") 201, and a local memory storage device 202, such as, for example, stackable cache or a plurality of registers. Control unit 200 is operable to fetch one or more processing system instructions from memory storage device 107. ALU 201 is operable to perform a plurality of operations, including addition and Boolean AND, needed to carry out the processing system instructions. Local memory storage device 202 is operable to provide local high speed storage used for storing temporary results and control information.

Figure 3:
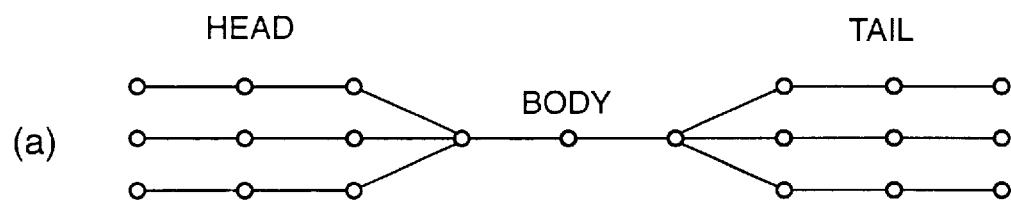
FIGS. 3A–3C illustrate a diagram of three inter-word context-dependent models.
Figure 3:
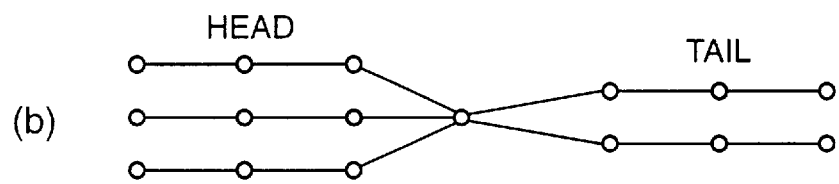
Figure 3:
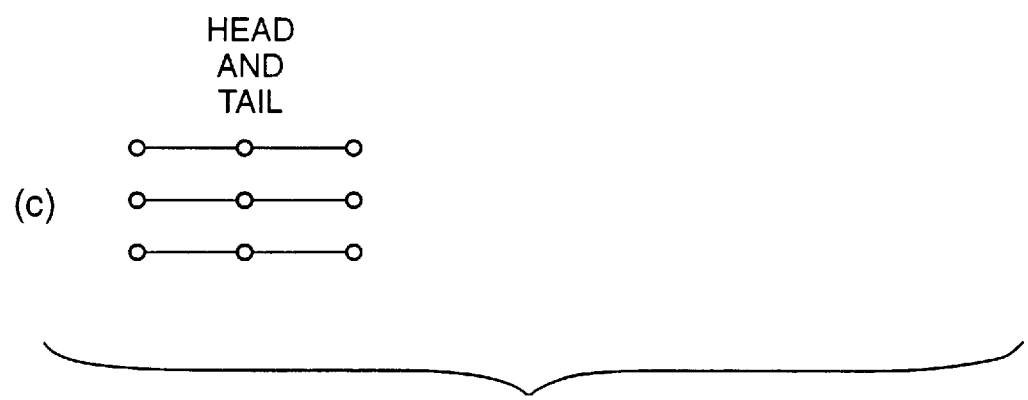
Figure 3A:
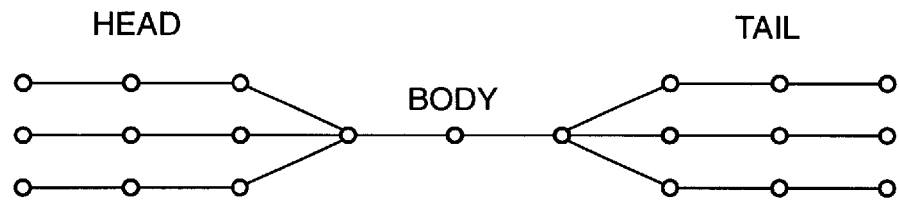
Figure 3B:
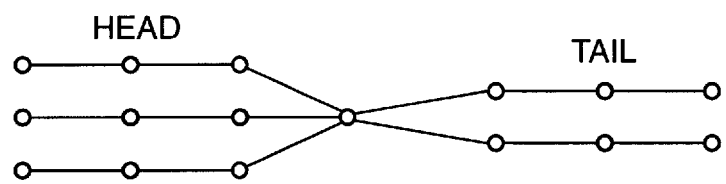
Figure 3C:
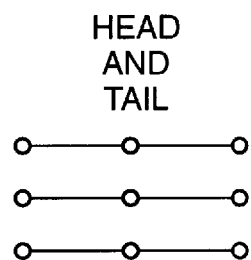

FIGS. 3A–3C illustrate a conceptual diagram of three inter-word context-dependent models. Each model includes one or more phones. A phone as used herein is the acoustic manifestation of one or more linguistically-based phonemes or phoneme-like items. Phones are typically defined by a lexicon, which is a vocabulary with definitions and/or explanations of all words.

FIG. 3A illustrates a multi-phone word model having at least three phones. Each multi-phone word model of at least three phones may be represented by three distinct segments, namely, a head, a body, and a tail. The head and the tail of each multi-phone word are inter-word model units which represent an uncertainty factor caused by adjacent words as a function of the basic phone set chosen for representing a particular vocabulary. Each of the head and the tail of any particular multi-phone word includes a collection of possible junction model units. The body of each word of at least three phones is presumed independent of neighboring words, and is typically referred to as an intra-word model.

FIG. 3B illustrates a two phone word model. A two phone word has a head and a tail, but does not have a body. This causes the head and tail units of the two phone word to merge directly with the tail and head units of previous and subsequent words, respectively.

FIG. 3C illustrates a single phone word model. The single phone does not have a body. The single phone word functions as both the head and tail for the word. The context of a single phone word encompasses two word junctions, namely, the junctions from the left and right word contexts. A single phone word is, in all possible surrounding contexts, represented by a collection of inter-word context dependent model units whose central phone corresponds to the particular single phone word itself.

In general, a continuous speech recognition search operates to determine the best sequence of words $w_1 \ldots w_n$ to maximize $$Pr(w_1 \ldots w_n)Pr(O_1 \ldots O_T|w_1 \ldots w_n),$$

wherein $Pr(w_1 \ldots w_n)$ represents the probability of the word sequence $w_1 \ldots w_n$ from the language model, and $Pr(O_1 \ldots O_T|w_1 \ldots w_n)$ represents the conditional probability from the acoustic model when observing an acoustic event represented by an acoustic feature vector sequence, $O_1 \ldots O_T$.

If a portion of the stochastic models used in a conventional speech recognition system is context-independent, or alternatively, a portion of the sub-word models whose context-dependencies are limited only to intra-word positions, the likelihood that the words in the sequence are independent of one another leads to a crude approximation of $Pr(O_1 \ldots O_T|w_1 \ldots w_n)$. That is $$Pr(O_1 \ldots O_T|w_1 \ldots w_n) = \prod_{i=1}^{n} Pr(O_1 \ldots O_{t_i}|w_i).$$

In contrast, utilization of inter-word context dependent models defines a probability distribution conditioned upon neighboring words or phone contexts, resulting in a more accurate approximation of the word string likelihood $Pr(O_1 \ldots O_T|w_1 \ldots w_n)$. It should be noted further that co-articulation in a continuous speech utterance often changes the acoustics of the various words being uttered. The increased acoustic uncertainty often occurs at transition regions and boundaries between words, phrases, or lexical entries. Short words, such as one- and two-phone and functional words, are often poorly articulated. As such, they are most affected by inter-word co-articulation and difficult to identify.

An aspect of a continuous speech recognizer in accordance with the principles of the present invention is a high resolution decoding scheme, when classifying acoustically confusable speech events, and more particularly, one- and two-phone words, as is disclosed in "An Algorithm of High Resolution and Efficient Multiple String Hypothesization for Continuous Speech Recognition Using Inter-word Models", by W. Chou, T. Matsuoka, B. H. Juang and C. H. Lee, in *PROC. of ICASSP* 94 (1994), vol. 2, pp. 153–156, which is incorporated herein by reference. In accordance with the illustrative embodiment, each inter-word context dependent recognition model is a HMM. Each HMM preferably has a fixed number of states. Although the principles of the present invention are explained in the context of HMMs, they may be suitably arranged and implemented in accordance with any speech recognizer utilizing forward graph search and backward traversal techniques.

The preferred decoding principles are based on maximum likelihood state sequence decoding procedures wherein a decoded word sequence is determined according to the log-likelihood of the best state sequence in a search graph or tree. The N-best string hypotheses are defined as a set of acoustic models, $\Lambda_A$, and a language model, $\Lambda_L$, whereby the best word string hypothesis, $S_1$, is determined by, $$S_1 = \bar{S} = arg \max_{S} \log f(O, \theta^S|\Lambda_A, S) + \log P_{\Lambda_L}(S),$$

wherein O is the feature vector sequence extracted from a received input speech wave-form, S is an arbitrary word string, and $\theta^S$ is the best state sequence given $\Lambda_A$ for word string S. The k-th best word string hypothesis $S_k$ is given by, $$S_k = \operatorname*{argmax}_{S \neq S_1, \ldots, S_{k-1}} \log f(O, \theta^S|\Lambda_A, S) + \log P_{\Lambda_L}(S),$$

wherein $S_1 \ldots S_{k-1}$ are the first through the k-1 best word string hypotheses.

Another aspect of the present invention is the integration of the language model, $\Lambda_L$, into the decoding process. In addition to the constraints imposed by the inter-word context dependent acoustic models, the constraints imposed by the language model are also incorporated into the search and traversal.

A Viterbi decoding algorithm finds the single best word string hypothesis. The techniques for performing the Viterbi algorithm are known. During the Viterbi search, only the best state sequence is retained for each state, $\theta^S$, at each time, t. The score on the best state sequence retained during the Viterbi search operates as the upper bound score among all paths reaching that state.

Beam searching techniques are preferably incorporated into the Viterbi search, such that only those paths having scores within a prescribed difference, $\Delta$, are retained. The techniques for performing a beam search are known. This difference is preferably determined on an application to application basis, ensuring that the upper bound of partial path scores obtained from the best path in the search beam remain valid. Utilization of beam search techniques is desirable to reduce computational complexity as compared with full search.

The N-best string hypothesization includes a partial path map preparation and a backward traversal. The forward partial path map preparation, which preferably is integrated with a forward beam search, is performed time synchronously. The backward traversal, which preferably is A* based, is performed time asynchronously. The backward tree search accordingly follows the forward partial path map from the backward search direction. In other words, the backward search follows the specifications and constraints of both the inter-word context dependent acoustic and language models used in the forward search.

The preferred A* based backward search efficiently handles the allophonic specifications of inter-word context dependent models at word, phrase and lexical boundaries, and, in particular, the word boundaries of short single phone words. The N-best word string hypotheses are generated sequentially according to their rank order with the best string hypothesis being generated first.

Recall that software is one preferred embodiment for using and/or distributing the present invention. The software includes a plurality of processing system instructions. The processing system instructions when executed control at least one processing unit for performing speech recognition in accordance with the principles of the present invention. Other preferred embodiments of the present invention may be implemented in firmware or hardware, to name two other examples.

The software embodiment is preferably programmed utilizing the "C" programming language, which is subsequently compiled into object code and stored. The stored processing system instructions may then be fetched, read, scanned, retrieved and/or the like, by a processing system, such as the personal computer 100 of FIG. 1, which in turn interprets and executes the processing system instructions to perform continuous speech recognition.

Figure 4:
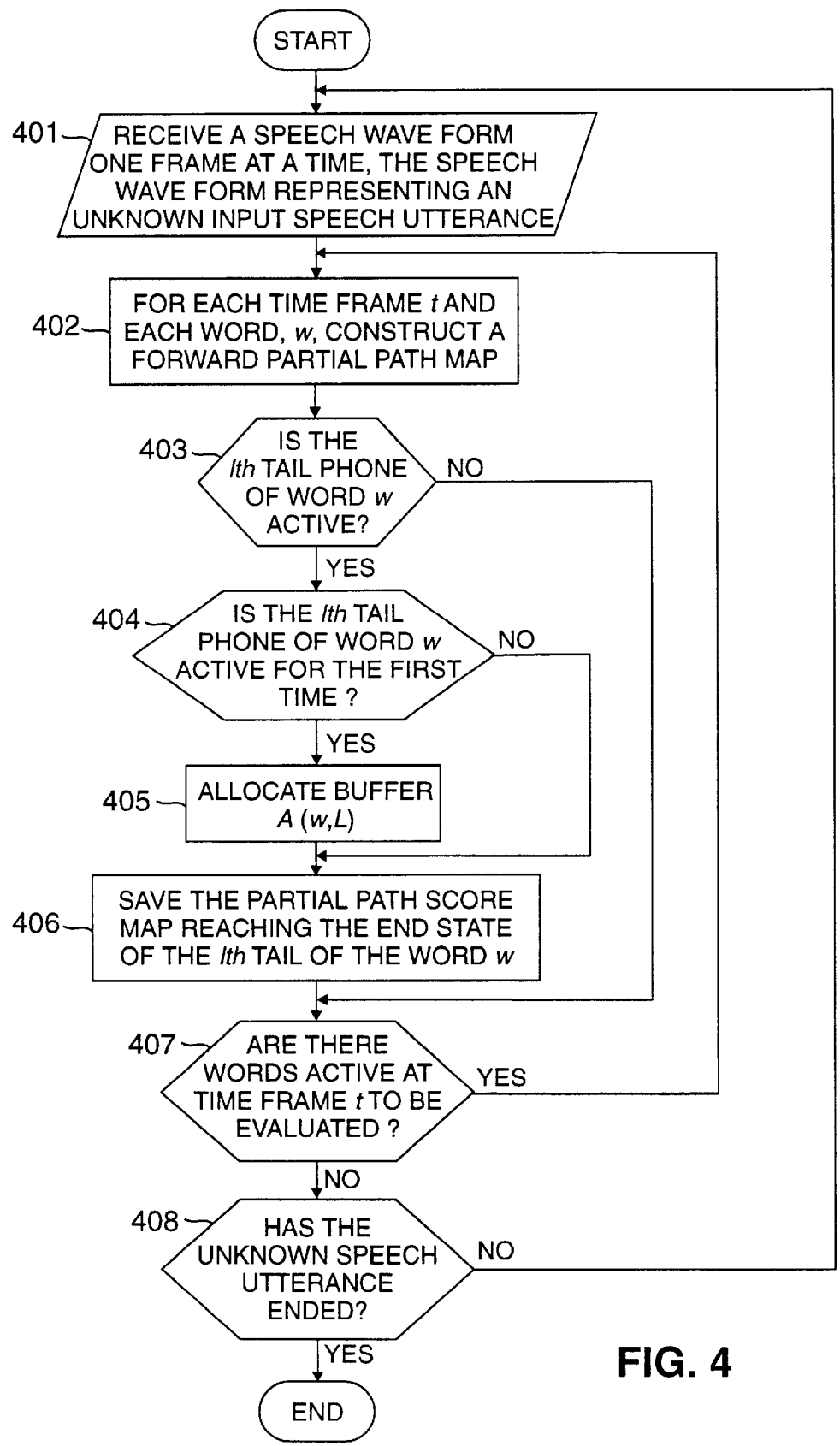
FIG. 4 illustrates a flow diagram of one preferred process for performing a forward partial path map preparation in accordance with the principles of the present invention.

FIG. 4 illustrates a flow diagram of a preferred process for performing a forward partial map preparation in accordance with the principles of the present invention. The forward partial path map is preferably constructed according to the allophonic specifications of inter-word context dependent tri-phone models and a language model, such as a bi-gram language model. A bi-gram language model more particularly is a probability model for pairs of words occurring within a particular utterance. The tri-phone models are used in both the forward and backward search and have a distributional specification which differs from a typical di-phone or context independent model used in the conventional forward search. A di-phone model more particularly is a model whose context dependency is defined according to one of either the left or right side contexts, and not according to the joint acoustic events of both left and right contexts.

The forward partial path map construction is generated during the forward beam search. During the forward search, and for each active word, w, at time frame t, the forward partial path map is constructed through the following procedural steps beginning with a START block.

A speech waveform is received by a processing system one frame at a time, input/output block 401. The speech waveform represents a speech utterance. Each frame, t, is represented by a feature vector corresponding to a speech waveform preferably having an approximate duration of 100 msec, for example. Included within the speech utterance preferably are one or more words.

The received speech utterance is preferably passed through a conventional feature extractor. The conventional feature extractor produces one or more observation or feature vectors characterizing the received speech input signal.

A forward partial path map is constructed for each frame, t, and each particular word, w, processing block 402. The preferred partial path map is constructed utilizing a two-dimensional data structure, A(w,l), wherein w is the present unknown word, or active word under consideration, and l is the present tail phone under consideration. The tail phone of the active word w specifies the allowable right phone context. A(w,l) is a conventional array or matrix, which preferably utilizes data items which include both data areas and address pointers.

A determination is made as to whether the l-th tail phone of word w has become active, decisional block 403. The l-th tail phone is active at frame t if a path reaching its terminal state exists. The time frame t preferably represents the frame rate of the windowed speech wave form. If the l-th tail phone of w is not active, NO branch of decisional block 403, then a determination is made as to whether there are other words active at frame t to be evaluated, decisional block 407.

If the l-th tail phone of w is active, YES branch of decisional block 403, then a determination is made as to whether the l-th tail phone of w is active for the first time, decisional block 404. If the l-th tail phone of w is active for the first time, YES branch of decisional block 404, a memory allocation is preferably made for A(w,l), processing block 405. In the event that the l-th tail phone is already active, NO branch of decisional block 404, this allocation step is bypassed.

The present partial path score reaching the end state of the l-th tail phone of the word w is saved to A(w,l), processing block 406. If the l-th tail phone was already active, meaning that the l-th tail phone of w was active in an earlier time frame, then the present partial path score is saved as an entry according to the ascending order of t. This saving procedure is preferable because each word node, and its multiple tails, will be activated in an increasing order of time in accordance with the frame synchronous search. The entries are therefore saved as set forth above to maintain an ascending order in time t.

Note, as previously discussed, that both the acoustic and language models are incorporated in the forward partial path map preparation and applied in a frame synchronous fashion. The present partial path score is the sum of the scores from both the acoustic and language models. In other words, the partial path score is the combination of both the acoustic and language model scores along a partial segment of the speech utterance.

It should be further noted, that in accordance with certain implementations, if the storage space in A(w,l) is full, another memory block having a pre-selected memory size equal to A(w,l) should be allocated and linked with the full array. It is preferable to use dynamic array allocation and programming techniques as neither the length of the received speech utterance, nor the number of times the l-th tail phone of the word w will become active, are known in advance.

A determination is made as to whether there are other words active at time frame t to be evaluated, decisional block 407. If no other words are active at frame t, NO branch of decisional block 407, then a determination is made as to whether the received speech utterance has ended, decisional block 408. If the speech utterance has not ended, NO branch of decisional block 408, then the process recycles. If the speech utterance has ended, YES branch of decisional block 408, then the process ends.

Figure 5A:
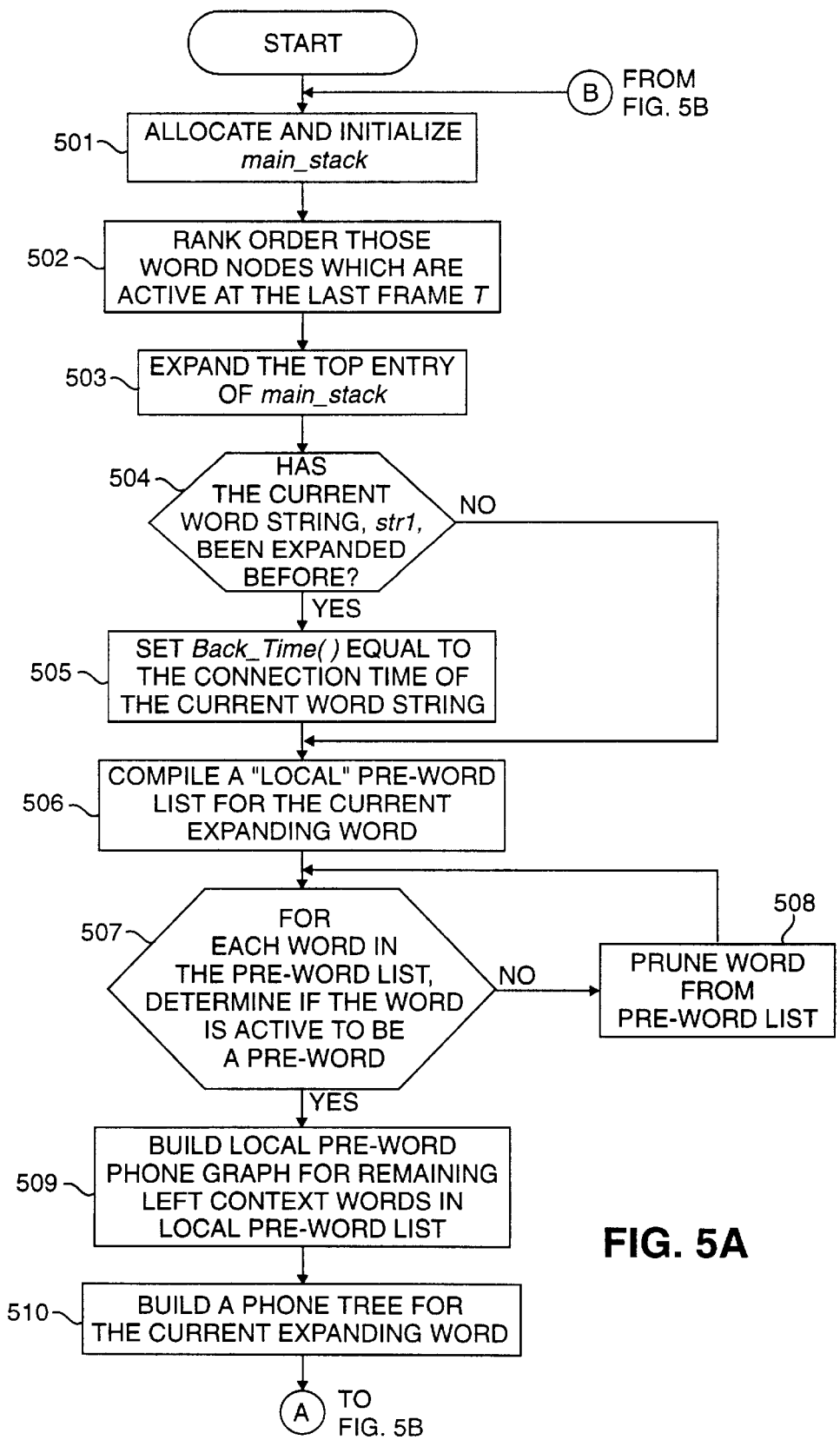
FIG. 5A and 5B illustrates a flow diagram of a process for performing a preferred backward search through the forward partial path map of FIG. 4 in accordance with the principles of the present invention.
Figure 5B:
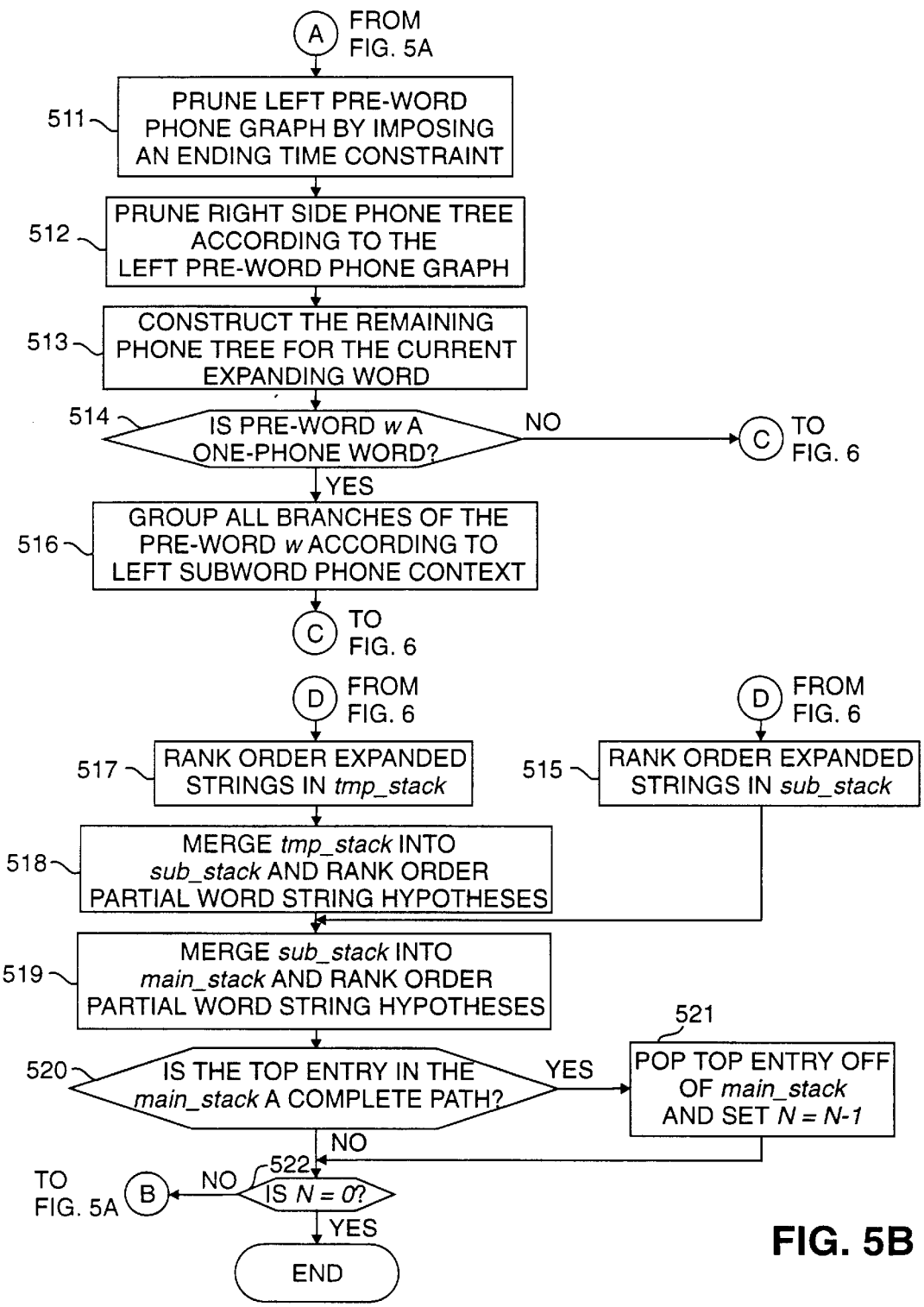

FIG. 5 illustrates a flow diagram of a preferred process for performing a backward traversal for multiple string hypothesization in accordance with the principles of the present invention. An A* based tree search is preferably utilized. The A* tree search is used to find the best path at the lowest cost using a node selection function f(n). The node selection function f(n) is preferably defined for every node n within the search graph.

In accordance with the preferred function f(n), the cost associated with a partial word string is defined as the negative of the string likelihood. In other words, the node selection function f(n) is the sum of two partial path cost estimates, namely, $$f(n)=h(n)+g(n),$$

wherein h(n) is an estimate of the lowest possible cost, h*(n), to complete the current partial path and g(n) is the cost of the current path ending at node n. In other words, the cost to complete the traversal. Cost estimate h(n) is defined as an optimistic estimate of h*(n) if h(n)<h*(n) for all n. A particular solution to the A* algorithm is therefore admissible only if h(n) is said to be optimistic.

The difference among various admissible heuristic estimates h(n) lies largely in search efficiency. Efficiency is the number of nodes expanded in order to find a single desired solution, or, as illustrated herein, to find "N" best solutions.

An algorithm $A_1$ is more efficient than another algorithm $A_2$, if every node expanded by $A_1$ is also expanded by $A_2$. In this case, $A_1$ is said to dominate $A_2$. An algorithm is optimal over a class of algorithms if it dominates all members of that class.

Alternatively, the quality of the heuristic function h(n) may be quantified by how close it is to the theoretical lowest cost upper bound h*(n). A heuristic function $h_1$ is accordingly said to be more informed than $h_2$ if both functions are admissible, and $h_1(n) > h_2(n)$ for every non-terminal node n. If $h_1(n)$ is more informative than $h_2(n)$, then an A* based algorithm according to $h_1(n)$ is more efficient than, or dominates, other A* based algorithms according to the heuristic $h_2(n)$.

The preferred heuristic function is the lowest cost h*(n) for completing the current partial path obtained during a forward Viterbi search. When implemented, therefore, the preferred backward A* traversal follows the exact specification of the detailed acoustic models and the structure of the language model used in the forward search, as has been discussed with reference to FIGS. 3A–3C and 4.

The preferred embodiment utilizes three stacks, namely, a main_stack, a sub-stack, and a tmp-stack. A stack as used herein is a processing system data structure for organizing memory as a linear list for storage. The main_stack preferably maintains a record of the current top, N, partial word string hypotheses. The sub-stack preferably provides one word extensions of the current top partial word string hypothesis of the main_stack. The tmp-stack assists the sub-stack maintain the allophonic specification of inter-word context dependent models for one-phone words.

The allophonic specification of inter-word context dependent models for one-phone words, as previously introduced, involves three words and two word junctions. This requires the backward A* traversal to operate beyond a one word junction and to follow the exact allophone based inter-word context dependency specifications utilized during the forward search. The preferred backward A* traversal achieves this through the following procedural steps beginning with a START block.

A main_stack based on the forward partial path map is allocated and initialized by rank ordering those word nodes which are active at the last frame T, processing block 501. At the end of the forward search, the forward partial path map retains a record of active word nodes and tails at time frame T. By checking the forward partial path map, word tails, which are active at the utterance ending time frame T are pushed onto the main_stack in rank order. Note that each of the active word tails may end an utterance. Preferably, a global variable BackTime (n) is defined and set equal to T. The main_stack includes N entries, and includes:

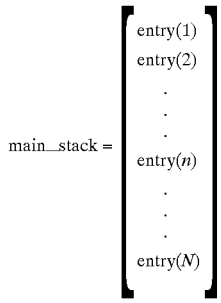

Each entry in the main_stack is preferably a data structure, and includes several preferred fields. More particularly, the nth entry of the main_stack is initialized as follows:

$$\text{entry}(n) = \{$$
$$\text{str} = \text{NULL}$$
$$\text{BackTime} = T$$
$$w_E = w_n$$
$$\text{ConnTail} = l_{w_n}$$
$$\text{ConnHead} = \text{NULL}$$
$$\text{G\_Score} = F\_P\_S(w_n, l_{w_n})[T]$$
$$\text{B\_Score} = \text{NULL}$$
$$\}$$

str is a backward partial word string of entry(n). Backtime is local variable within the structure, and represents the current starting time of the backward partial word string str of entry(n). WE is the current expanding word of word node n. $w_n$ and $l_{w_n}$ are the word node and tail of the nth entry, respectively, in the main_stack. ConnTail is the connection tail of entry(n). ConnHead is the connection head of entry (n). $F\_P\_S(w_n, l_{w_n})[T]$ is the score from the forward search in the forward partial path map which reaches the end state of the tail $l_{w_n}$ at time frame T, the ending time of the utterance. G_Score is the global path score estimate of the best path which can be generated from entry(n). B_Score is the partial path score from the backward traversal.

The current expanding word, WE, of the first word string, $str_1$, of the top entry, entry(1), of the main_stack is expanded, processing block 503. If the first word string, $str_1$, has been expanded before, YES branch of decisional block 504, then BackTime(1) is set equal to the connection time for $str_1$, processing block 505. It should be noted that the BackTime( ) will be decreased with each backward expansion as the starting time of the backward partial word string, str, is expanded backward towards the beginning of the utterance. If $str_1$ is being expanded for the first time, NO branch of decisional block 504, then processing block 505 is bypassed.

A "local" pre-word list for $w_E$ is compiled, processing block 506. If the current word, w, is not active for time frame $0 \leq t < \text{BackTime}(1) - \text{dur}_{min}(w_E)$, NO branch of decisional block 507, then prune w out of the left-context word list, processing block 508. $\text{dur}_{min}(w_E)$ is the minimum duration of the current expanding word. If the current word, w, is active for time frame $0 \leq t < \text{BackTime}(1) - \text{dur}_{min}(w_E)$, YES branch of decisional block 507, then bypass processing block 508.

A local pre-word phone graph for the remaining left context words in the local pre-word list is built, processing block 509. In other words, the active pre-word list is used to construct a local phone graph describing the ending phone context of the active pre-word list. Note that each pre-word may be represented by a phone network according to the given lexicon.

A phone tree for $w_E$ on the right side of the word junction between the remaining left context words and $w_E str_1$ is built, processing block 510, wherein the current expansion word is set as follows, $$w_E = \text{entry}(1) \rightarrow w_E,$$

the current backward partial word string is given by, $$\text{str} = \text{entry}(1) \rightarrow \text{str},$$

and $w_E str_1$ is a word string obtained by concatenating the expansion word $w_E$ with the partial word string $str_1$. A decoding network for $w_E$, which is represented by a linked list graph of context dependent models, is thereby constructed.

The left pre-word phone graph built during processing block 509 is pruned by imposing an ending time constraint, processing block 511. Assuming $dur_{min}(W)$ to be the minimum duration of w, word nodes which are active between $BackTime-dur_{min}(w_E) \leq t \leq BackTime$ cannot be the pre-word for $w_E$ because the starting point of $w_E$ must be earlier than time $BackTime-dur_{min}(w_E)$. The pre-word nodes which do not satisfy this ending time constraint are preferably pruned from the active pre-word list of $w_E$. In other words, the l-th tail phone of word w in the remaining pre-word list is pruned if it is not active for the time frame $dur_{min}(W) \leq t < BackTime(l)-dur_{min}(w_E)$.

The right side phone tree of $w_E$ is pruned according to the remaining left context word phone graph, processing block 512. In other words, the l-th head phone of $w_E$ is pruned if there is no allowable connection from that head phone to the remaining pre-word phone graph on the left side of the word junction. Note that although the described backward traversal is conducted in a reverse search direction with respect to the forward partial path, the connections between inter-word context dependent models are maintained according to the exact context dependency applied during the forward search. Further, if a head in the decoding network of $w_E$ has no allowable connections to one of the tails in the decoding network of the pre-word phone graph built during processing block 509, then this head will not be involved in the expansion of $w_E$ and is accordingly pruned from the decoding network of $w_E$.

The remaining phone tree of $w_E$ is constructed in the backward direction, processing block 513. Note that this is a dynamic programming step which is used to find the best expansion path of $w_E$ according to the decoding network built during processing block 510. This is performed in the backward direction from the current BackTime( ) to the starting time of the utterance. If a maximum duration constraint is applied to $w_E$. The longest expansion path of $w_E$ may end at a point between the BackTime( ) and the starting time of the speech utterance.

Each word, w, in the remaining pre-word list is examined to determine if it is a one phone word, decisional block 514. If w is not a one phone pre-word of $w_E$, NO branch of decisional block 514, then a global score estimate of the best connection path, a connection time, a corresponding connection tail, and a connection head are determined.

Figure 6:
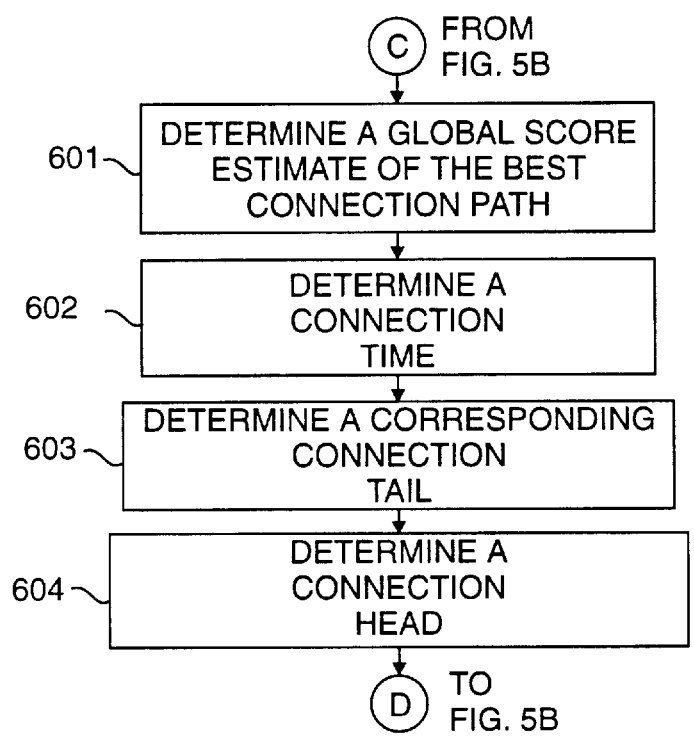
FIG. 6 illustrates a flow diagram of a process for determining a global score estimate of the best connection path, a connection time, a corresponding connection tail and a connection head in accordance with the principles of the present invention.

FIG. 6 illustrates a flow diagram of a process for determining the global score estimate of the best connection path, the connection time, the corresponding connection tail, and the connection head in accordance with the principles of the present invention. The global score estimate of the best connection path, $ConnScore_{<ww_Estr>}(w_E)$, for each pre-word w and each time $0 \leq t \leq BackTime-dur_{min}(w)$ is the path score which connects the expanded backward partial path and the forward partial path at time frame t from the forward partial path map, processing block 601. This is according to the following criterion, $ConnScore_{<ww_Estr>}(t, l_w, i_h) =$ $$F\_P\_S(w, l_w)[t]$$
$$B\_P\_S(w_E, i_h)[t+1] + Forward\_P_{A_L}(w_E|w),$$

wherein, $F\_P\_S(w,l_w)[t]$ is the path score in the forward partial path map which reaches the end state of the lth tail of pre-word w at time frame t. $B\_P\_S(w_E,i_h)$ [t+1] is the score of the backward partial path which reaches the first state of the $i_h$th head of $w_E$ at time frame t+1, and $Forward\_P_{A_L}(w_E|w)$ is the score from the same language model used in generating the forward partial path map.

The best connection time, $ConnTime_{<ww_Estr_l>}(w_E) = t_c$, is defined to be, $$t_c^{<ww_Estr>} = \underset{0 \leq t \leq BackTime \quad l_w, i_h}{argmax} [argmax\ ConnScore_{<ww_Estr>}(t, l_w, i_h)],$$

processing block 602.

The corresponding connection tail, $ConnTail_{<ww_Estr>}(w_E) = l_w$, is defined to be $$ConnTail_{<ww_Estr>} = \underset{l_w \quad i_h}{argmax} [argmax\ ConnScore_{<ww_Estr>}(T_c^{<ww_Estr>}, l_w, i_h)],$$

processing block 603.

The connection head, $ConnHead_{<wE>(w)} = i_h$, is defined to be, $$ConnHead_{<ww_Estr>} = \underset{i_h}{argmax}[ConnScore_{<ww_Estr>}(t_c^{<ww_Estr>}, ConnTail_{<ww_Estr>}, i_h)],$$

processing block 604.

Returning to FIG. 5, in accordance with the scoring criterion discussed hereinabove, the ConnScores for all partial strings $ww_Estr$, wherein w is an allowable pre-word of $w_E$, are rank ordered. Each partial string, $ww_Estr$ is pushed onto the sub-stack, processing block 515. The sub-stack has N entries, and is given by, wherein,

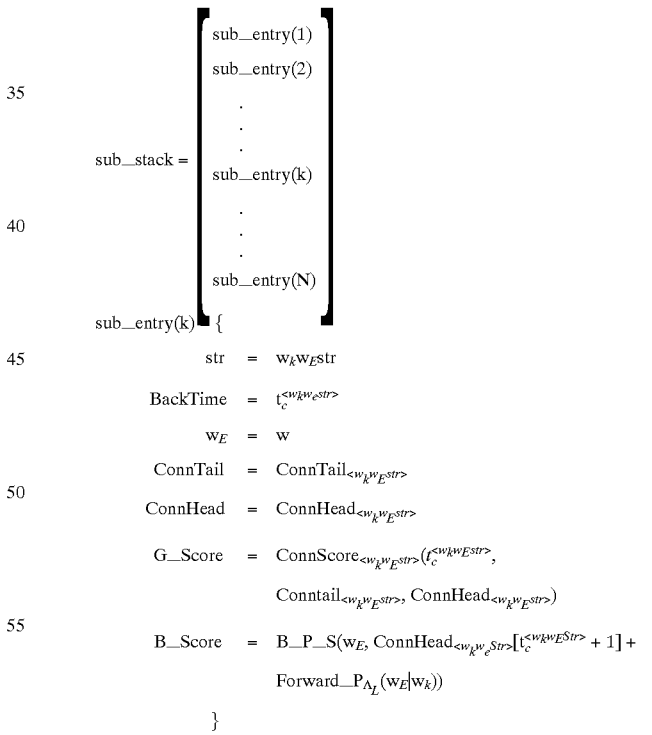

If w is a one phone pre-word of $w_E$, YES branch of decisional block 514, then all branches of the word w of the pre-word phone graph are grouped according to the left subword phone context, processing block 516. Since w is a one phone pre-word of $w_E$ in the pre-word list, the decoding network for w is modeled by a collection of inter-word context dependent models corresponding to the different ending phone contexts of the words which can precede w and different head phone contexts from the expansion word $w_E$.

More particularly, the context dependent models of w are grouped in accordance with the ending phone context of words which can precede w. Each group is preferably pruned to remove the branches of each group whose right phone context is not allowed to connect with the heads of $w_E$. Each group is treated as a decoding network for a word and the procedures as previously set forth in connection with the detailed discussion of FIG. 6 are performed.

Returning to FIG. 5, the expanded strings are preferably rank ordered in tmp-stack, processing block 517, $$\text{tmp\_stack} = \begin{bmatrix} \text{tmp\_entry}(1) \\ \text{tmp\_entry}(2) \\ \cdot \\ \cdot \\ \text{tmp\_entry}(k) \\ \cdot \\ \cdot \\ \text{tmp\_entry}(N) \end{bmatrix}$$

tmp_entry(k) {

$$\begin{aligned}
\text{str} &= w_k w_E \text{str} \\
\text{BackTime} &= t_c^{<w_k w_E str>} \\
w_E &= w \\
\text{ConnTail} &= \text{ConnTail}_{<w_k w_E str>} \\
\text{ConnHead} &= \text{ConnHead}_{<w_k w_E str>} \\
\text{G\_Score} &= \text{ConnScore}_{<w_k w_E str>}(t_c^{<w_k w_E str>}, \\
&\quad \text{Conntail}_{<w_k w_E str>}, \text{ConnHead}_{<w_k w_E str>}) \\
\text{B\_Score} &= \text{B\_P\_S}(w_E, \text{ConnHead}_{<w_k w_E str>}[t_c^{<w_k w_E str>} + 1] + \\
&\quad \text{Forward\_P}_{\Lambda_L}(w_E|w_k))
\end{aligned}$$

}

It should be noted that the entries in the tmp_stack have the same one-phone word, w, as the next expansion word, however, the left phone context of w results in a different expansion path for each entry. The inter-word context dependency of one-phone words is, therefore, exactly preserved in the backward traversal by looking back to the phone context of the previous two word junctions.

The tmp-stack is merged into the sub-stack, processing block 518. The expanded partial word string hypotheses are rank ordered.

The sub-stack is merged into the main-stack, processing block 519. The expanded partial word string hypotheses are rank ordered.

If partial word string $str_1$, the top entry, entry(1), in the main_stack, is a complete path, YES branch of decisional block 520, then the word string $str_1$ is popped out of main_stack and N is set equal to N-1, processing block 521. The partial word string of the top entry, entry(1), in the main_stack is a complete path if BackTime=0. Popping entry(1) from the main_stack causes the remaining entries in main_stack to move up, in other words, entry(2) of main_stack becomes the first entry, and is therefore ready to be expanded in accordance with the preferred backward search.

If N=0, YES branch of decisional block 522, then the process proceeds to the END block, otherwise the process repeats, NO branch of decisional block 522.

The left and right pruning procedures implement a deep pruning scheme reducing the search complexity encountered with inter-word context dependent models. The pruning procedure is carried out at the word node level, the phone node level and at the level of the final decoding network. A preceding word connects only with the current word if it has an ending tail unit that may be connected with the current expansion word and is active before the current BackTime ( ). The ordering of the left-then-right pruning procedures is preferable because a minimal and sufficient decoding network for the current expansion word $w_E$ depends on the final shape of the pre-word decoding network which is at the left side of the word junction. Because the head of $w_E$ depends only on the last phone of the preceding words, only one arc for each distinct ending phone of the preceding words need to be constructed. Through pruning, the number of arcs needed to represent various connection heads of $w_E$ is less than, and typically substantially less than, the number of distinct phones. This is independent of the vocabulary size.

The preferred N-best string hypothesization algorithm is consistent, meaning that the triangle inequality for geodesics holds for any pair of word nodes, namely, $$h(n) \leq k(n,n') + h(n') \text{ for all n, n'},$$

wherein k(n, n') is the lowest cost from node n to node n'. Further, if h(n) is consistent and admissible, then an A* based algorithm according to h(n) largely dominates every admissible algorithm having access to that same h(n). The preferred A* algorithm uses the partial cost function h*(n), wherein all stacks are preferably pruned to N independent entries, and one-phone words are preferably treated as N independent entries. The consistent use of the same set of inter-word context dependent models and the same forward language model in both forward partial path map preparation and the backward tree search is preferred.

Although the present invention and its advantages have been described in detail, it should be understood that various changes, substitutions and alterations can be made herein without departing from the spirit and scope of the invention.

We claim:

1. A speech recognition system comprising:
   means for receiving an input signal representing a speech utterance;
   means for storing a plurality of recognition models having allophonic specifications wherein ones of said plurality of recognition models include one or more inter-word context dependent models and one or more language models; and
   means for processing said input signal utilizing ones of said plurality of recognition models to generate one or more string hypotheses of said input signal, said processing means including:
   means for producing a forward partial path map according to the allophonic specifications of at least one inter-word context dependent model and at least one language model; and
   means for traversing said forward partial path map in the backward direction as a function of said allophonic specifications to generate said one or more string hypotheses.

2. The system as set forth in claim 1 wherein said storing means further operates to store a plurality of processing unit instructions.

3. The system as set forth in claim 2 wherein said processing means includes one or more processing units and is further operable to retrieve and execute selected ones of said processing unit instructions, said selected ones of said processing unit instructions directing said processing means to process said input signal utilizing ones of said plurality of recognition models to generate said one or more string hypotheses of said input signal.

4. The system as set forth in claim 1 wherein said producing means operates time synchronously with respect to said input signal.

5. The system as set forth in claim 1 wherein said producing means uses a Viterbi search.

6. The system as set forth in claim 5 wherein said producing means uses a beam search.

7. The system as set forth in claim 1 wherein said traversing means operates time asynchronously with respect to said input signal.

8. The system as set forth in claim 1 wherein ones of said plurality of recognition models are tri-phone recognition models.

9. The system as set forth in claim 1 wherein one or more of said plurality of recognition models represent a one phone word.

10. The system as set forth in claim 1 wherein said processing means utilizes pruning techniques.

11. The system as set forth in claim 1 wherein said traversing means further operates to complete said forward partial path map.

12. The system as set forth in claim 1 wherein one or more of said plurality of recognition models is a Hidden Markov Model.

13. A method for generating one or more string hypotheses from a received input signal, said received input signal representing a speech utterance, said method comprising the steps of:

utilizing ones of a plurality of recognition models having allophonic specifications to process said received input signal, said plurality of recognition models including at least one or more inter-word context dependent models and one or more language models;

producing a search graph in a first direction according to the allophonic specifications of at least one [of a particular] inter-word context dependent model and [a particular] at least one language model; and traversing said search graph in a second direction as a function of said allophonic specifications to generate said one or more string hypotheses.

14. The method as set forth in claim 13 wherein said utilizing step is preceded by the step of storing said plurality of recognition models to a storage device.

15. The method as set forth in claim 13 wherein said producing step is performed time synchronously with respect to said received input signal.

16. The method as set forth in claim 13 wherein said utilizing step is preceded by the step of generating one or more feature vectors characterizing said received input signal.

17. The method as set forth in claim 13 wherein said producing step further includes the step of using a Viterbi search.

18. The method as set forth in claim 13 wherein said producing step further includes the step of using a beam search.

19. The method as set forth in claim 13 wherein said traversing step is performed time asynchronously with respect to said received input signal.

20. The method as set forth in claim 13 further including the step of using one or more tri-phone recognition models.

21. The method as set forth in claim 13 wherein one or more of said plurality of recognition models represent a one phone word.

22. The method as set forth in claim 13 further including the step of pruning said search graph.

23. The method as set forth in claim 13 wherein said traversing step further includes the step of completing said search graph.

24. The method as set forth in claim 13 wherein one or more of said plurality of recognition models is a Hidden Markov Model.

25. A storage medium which is readable by a processing system, said storage medium including a plurality of processing system instructions operable to direct said processing system to perform speech recognition, said storage medium comprising:

a first instruction set for storing a received input signal representing a speech utterance;

a second instruction set for storing a plurality of recognition models having allophonic specifications wherein ones of said plurality of recognition models include one or more inter-word context dependent models and one or more language models; and a third instruction set for utilizing ones of said plurality of recognition models to produce a forward partial path map according to the allophonic specifications of at least one of said inter-word context dependent models and at least one of said language models, and to traverse said forward partial path map in the backward direction as a function of said allophonic specifications to generate one or more string hypotheses of said input signal.

26. The storage medium as set forth in claim 25 wherein said storage medium is selected from the group consisting of:

a magnetic device operable to utilize patterns of magnetism to store said processing system instructions, a semiconductor chip operable to utilize on-off electric charges to store said processing system instructions, and an optical memory operable to utilize on-off light beams to store said processing system instructions.

27. The storage medium as set forth in claim 25 wherein said third instruction set operates to produce said forward partial path map time synchronously with respect to said input signal.

28. The storage medium as set forth in claim 25 wherein said third instruction set uses a Viterbi search.

29. The storage medium as set forth in claim 25 wherein said third instruction set uses a beam search.

30. The storage medium as set forth in claim 25 wherein said third instruction set operates to traverse said forward partial path map time asynchronously with respect to said input signal.

31. The storage medium as set forth in claim 25 wherein ones of said plurality of recognition models are tri-phone recognition models.

32. The storage medium as set forth in claim 25 wherein one or more of said plurality of recognition models represent a one phone word.

33. The storage medium as set forth in claim 25 wherein said third instruction set uses pruning techniques.

34. The storage medium as set forth in claim 25 wherein said third instruction set completes said forward partial path map.

35. The storage medium as set forth in claim 25 wherein one or more of said plurality of recognition models is a Hidden Markov Model.

* * * * *